US005733510A

United States Patent [19]

Chinh et al.

[11] Patent Number: 5,733,510
[45] Date of Patent: Mar. 31, 1998

[54] FLUIDIZED BED POLYMERIZATION REACTOR

[75] Inventors: Jean-Claude Chinh; Michel C. H. Filippelli, both of Martigues, France; David Newton, Surrey; Michael Bernard Power, London, both of England

[73] Assignee: BP Chemicals Limited, London, United Kingdom

[21] Appl. No.: 602,013

[22] Filed: Feb. 15, 1996

Related U.S. Application Data

[62] Division of Ser. No. 256,052, filed as PCT/GB94/01074, May 19, 1994, Pat. No. 5,541,270.

[30] Foreign Application Priority Data

| May 20, 1993 | [GB] | United Kingdom | 9310387 |
| May 20, 1993 | [GB] | United Kingdom | 9310388 |
| May 20, 1993 | [GB] | United Kingdom | 9310390 |
| May 19, 1994 | [WO] | WIPO | PCT/GB94/01074 |

[51] Int. Cl.$^6$ ................................................. B01J 8/24
[52] U.S. Cl. ........................... 422/143; 422/138; 422/146
[58] Field of Search ........................................ 422/138, 143, 422/146

[56] References Cited

U.S. PATENT DOCUMENTS

| 4,460,963 | 7/1984 | Kriedler et al. | 364/426.021 |
| 4,933,149 | 6/1990 | Rhee et al. | 422/131 |
| 5,352,749 | 10/1994 | DeChellis et al. | 526/68 |

FOREIGN PATENT DOCUMENTS

| 0088638A2 | 9/1983 | European Pat. Off. . |
| 0089691A2 | 9/1983 | European Pat. Off. . |
| 0260154A2 | 3/1988 | European Pat. Off. . |
| 0301872A1 | 2/1989 | European Pat. Off. . |
| 0173261B1 | 9/1991 | European Pat. Off. . |
| 1487845 | 5/1967 | France . |
| 1398965 | 6/1975 | United Kingdom . |

OTHER PUBLICATIONS

Copy of International Search Report mailed Aug. 24, 1994.

*Primary Examiner*—Thomas R. Weber
*Attorney, Agent, or Firm*—Finnegan, Henderson, Farabow, Garrett & Dunner

[57] ABSTRACT

A fluidized bed polymerization reactor which is a generally cylindrical vessel having a longitudinal axis and a fluidization grid located in the vessel generally perpendicular to the longitudinal axis of the vessel and defining a fluidized bed region above the fluidization grid. The reactor has an inlet for continuously introducing a gaseous stream of polymerizable monomers into the vessel below the fluidization grid at a gas velocity sufficient to maintain particles in the fluidized bed region in a suspended and fluidized condition; an outlet for removing polymer product from the fluidized bed region and an outlet for continuously removing an outlet stream of gaseous unreacted polymerizable monomer from the fluidized bed region. A cooling device cools at least a part of the outlet stream to a temperature at which liquid condenses out of the outlet stream, and a separating device separates at least a part of the cooled outlet stream into condensed liquid and a cooled gaseous stream. The separated cooled gaseous stream is returned to the inlet and an injection device injects at least a part of the condensed liquid into the fluidized bed region at a point where the gaseous stream of polymerizable monomers passing through the vessel has substantially reached the operating temperature of the polymerization reactor. The injection device includes at least one gas induced atomizing nozzle for injecting an atomized stream of the condensed liquid into the fluidized bed region in a direction generally perpendicular to the longitudinal axis of the vessel.

26 Claims, 6 Drawing Sheets

FLUIDIZED BED POLYMERIZATION REACTOR

This is a division of application Ser. No. 08/256,052, filed as PCT/GB94/01074, May 19, 1994, U.S. Pat. No. 5,541,270.

BACKGROUND OF THE INVENTION

The present invention relates to a continuous process for the gas-phase polymerisation of olefins in a fluidised bed reactor, and in particular to a process having improved levels of productivity.

Processes for the homopolymerisation and copolymerisation of olefins in the gas phase are well known in the art. Such processes can be conducted for example by introducing the gaseous monomer into a stirred and/or fluidised bed comprising preformed polyolefin and a catalyst for the polymerisation.

In the fluidised bed polymerisation of olefins, the polymerisation is conducted in a fluidised bed reactor wherein a bed of polymer particles are maintained in a fluidised state by means of an ascending gas stream comprising the gaseous reaction monomer. The start-up of such a polymerisation generally employs a bed of preformed polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles, polymer product particles and catalyst particles. This reaction mixture is maintained in a fluidised condition by the continuous upward flow from the base of the reactor of a fluidising gas which comprises recycle gas from the top of the reactor together with make-up feed.

The fluidising gas enters the bottom of the reactor and is passed, preferably through a fluidisation grid, to the fluidised bed.

The polymerisation of olefins is an exothermic reaction and it is therefore necessary to provide means to cool the bed to remove the heat of polymerisation. In the absence of such cooling the bed would increase in temperature until, for example, the catalyst became inactive or the bed commenced to fuse. In the fluidised bed polymerisation of olefins, the preferred method for removing the heat of polymerisation is by supplying to the polymerisation reactor a gas, preferably the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, diluent gas or a gaseous chain transfer agent such as hydrogen. Thus the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the afore-mentioned type is restricted by the maximum rate at which heat can be removed from the reactor. The rate of heat removal can be increased for example, by increasing the velocity of the recycle gas and/or reducing the temperature of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practice is normally determined by the temperature of the industrial cooling water available on site. Refrigeration can be employed if desired, but this adds to the production costs. Thus, in commercial practice, the use of cooled recycle gas as the sole means of removing the heat of polymerisation from the gas fluidised bed polymerisation of olefins has the disadvantage of limiting the maximum production rates obtainable.

The prior art suggests a number of methods for removing heat from gas fluidised bed polymerisation processes.

GB 1415442 relates to the gas phase polymerisation of vinyl chloride in a stirred or fluidised bed reactor, the polymerisation being carried out in the presence of at least one gaseous diluent having a boiling point below that of vinyl chloride. Example 1 of this reference describes the control of the temperature of polymerisation by the intermittent addition of liquid vinyl chloride to fluidised polyvinyl chloride material. The liquid vinyl chloride evaporated immediately in the bed resulting in the removal of the heat of polymerisation.

U.S. Pat. No. 3,625,932 describes a process for polymerisation of vinyl chloride wherein beds of polyvinyl chloride particles within a multiple stage fluidised bed reactor are kept fluidised by the introduction of gaseous vinyl chloride monomer at the bottom of the reactor. Cooling of each of the beds to remove heat of polymerisation generated therein is provided by spraying liquid vinyl chloride monomer into the ascending gas stream beneath the trays on which the beds are fluidised.

FR 2215802 relates to a spray nozzle of the non-return valve type, suitable for spraying liquids into fluidised beds, for example in the gas fluidised bed polymerisation of ethylenically unsaturated monomers. The liquid, which is used for cooling the bed, can be the monomer to be polymerised, or if ethylene is to be polymerised, it can be a liquid saturated hydrocarbon. The spray nozzle is described by reference to the fluidised bed polymerisation of vinyl chloride.

GB 1398965 discloses the fluidised bed polymerisation of ethylenically unsaturated monomers, especially vinyl chloride, wherein thermal control of the polymerisation is effected by injecting liquid monomer into the bed using one or more spray nozzles situated at a height between 0 and 75% of that of the fluidised material in the reactor.

U.S. Pat. No. 4,390,669 relates to homo- or copolymerisation of olefins by a multi-step gas phase process which can be carried out in stirred bed reactors, fluidised bed reactors, stirred fluidised bed reactors or tubular reactors. In this process polymer obtained from a first polymerisation zone is suspended in an intermediate zone in an easily volatile liquid hydrocarbon, and the suspension so obtained is fed to a second polymerisation zone where the liquid hydrocarbon evaporates. In Examples 1 to 5, gas from the second polymerisation zone is conveyed through a cooler (heat exchanger) wherein some of the liquid hydrocarbon condenses (with comonomer if this is employed). The volatile liquid condensate is partly sent in the liquid state to the polymerisation vessel where it is vaporised for utilisation in removing the heat of polymerisation by its latent heat of evaporation. This reference does not state specifically how the liquid is introduced into the polymerisation.

EP 89691 relates to a process for increasing the space time yield in continuous gas fluidised bed processes for the polymerisation of fluid monomers, the process comprising cooling part or all of the unreacted fluids to form a two phase mixture of gas and entrained liquid below the dew point and reintroducing said two phase mixture into the reactor. This technique is referred to as operation in the "condensing mode". The specification of EP89691 states that a primary limitation on the extent to which the recycle gas stream can be cooled below the dew point is in the requirement that gas-to-liquid be maintained at a level sufficient to keep the liquid phase of the two phase fluid mixture in an entrained or suspended condition until the liquid is vaporised, and further states that the quantity of liquid in the gas phase should not exceed about 20 weight percent, and preferably should not exceed about 10 weight percent, provided always that the velocity of the two phase recycle stream is high enough to keep the liquid phase in suspension in the gas and to support the fluidised bed within the reactor. EP 89691 further discloses that it is possible to form a two-phase fluid stream within the reactor at the point of injection by separately injecting gas and liquid under conditions which will produce a two phase stream, but that there is little advantage seen in operating in this fashion due to the added and unnecessary burden and cost of separating the gas and liquid phases after cooling.

EP173261 relates in particular to improvements in the distribution of fluid introduced into fluidised bed reactors and refers in particular to operation in the condensing mode as described in EP89691 (supra). More particularly, EP173261 states that operation using an inlet to the base of the reactor (beneath the distribution plate or grid) of the standpipe/conical cap type (as depicted in the drawings of EP 89691) is not satisfactory for a condensing mode of operation due to liquid flooding or frothing in the bottom head, a phenomenon experienced with commercial reactors at relatively low levels of liquid in the recycle stream.

SUMMARY OF THE INVENTION

It has now been found that by cooling the recycle gas stream to a temperature sufficient to form a liquid and a gas and by separating the liquid from the gas and then feeding the liquid directly to the fluidised bed, the total amount of liquid which may be reintroduced into the fluidised bed polymerisation reactor for the purpose of cooling the bed by evaporation of the liquid can be increased thereby enhancing the level of cooling to achieve higher levels of productivity.

Thus according to the present invention there is provided a continuous gas fluidised bed process for the polymerisation of olefin monomer selected from (a) ethylene, (b) propylene (c) mixtures of ethylene and propylene and (d) mixtures of a, b or c with one or more other alpha-olefins in a fluidised bed reactor by continuously recycling a gaseous stream comprising at least some of the ethylene and/or propylene through a fluidised bed in said reactor in the presence of a polymerisation catalyst under reactive conditions, at least part of the said gaseous stream withdrawn from said reactor being cooled to a temperature at which liquid condenses out, separating at least part of the condensed liquid from the gaseous stream and introducing at least part of the separated liquid directly into the fluidised bed at or above the point at which the gaseous stream passing through the fluidised bed has substantially reached the temperature of the gaseous stream being withdrawn from the reactor.

The gaseous recycle stream withdrawn from the reactor (hereafter referred to as the "unreacted fluids") comprises unreacted gaseous monomers, and optionally, inert hydrocarbons, reaction activators or moderators as well as entrained catalyst and polymer particles.

The recycled gaseous stream fed to the reactor additionally comprises sufficient make-up monomers to replace those monomers polymerised in the reactor.

DETAILED DESCRIPTION OF THE INVENTION

The process according to the present invention is suitable for the manufacture of polyolefins in the gas phase by the polymerisation of one or more olefins at least one of which is ethylene or propylene. Preferred alpha-olefins for use in the process of the present invention are those having from 3 to 8 carbon atoms. However, small quantities of alpha olefins having more than 8 carbon atoms, for example 9 to 18 carbon atoms, can be employed if desired. Thus it is possible to produce homopolymers of ethylene or propylene or copolymers of ethylene or propylene with one or more $C_3$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene or propylene monomer, or as partial replacement for the $C_3$–$C_8$ monomer are dec-1-ene and ethylidene norbornene.

When the process is used for the copolymerisation of ethylene or propylene with alpha-olefins the ethylene or propylene is present as the major component of the copolymer, and preferably is present in an amount at least 70% of the total monomers.

The process according to the present invention may be used to prepare a wide variety of polymer products for example linear low density polyethylene (LLDPE) based on copolymers of ethylene with butene, 4-methylpent-1-ene or hexene and high density polyethylene (HDPE) which can be for example, homopolyethylene or copolymers of ethylene with a small portion of higher alpha olefin, for example, butene, pent-1-ene, hex-1-ene or 4-methylpent-1-ene.

The liquid which condenses out of the recycle gaseous stream can be a condensable monomer, e.g. butene, hexene, octene used as a comonomer for the production of LLDPE or may be an inert condensable liquid, e.g. butane, pentane, hexane.

It is important that the liquid should vaporise within the bed under the polymerisation conditions being employed so that the desired cooling effect is obtained and to avoid substantial accumulation of liquid within the bed. Suitably at least 95, preferably at least 98 weight percent and most preferably substantially all of the liquid fed to the bed evaporates therein. In the case of liquid comonomers, some of the comonomer polymerises in the bed, and such polymerisation can be from the liquid and the gas phase. As is well known in conventional gas phase polymerization or copolymerisation processes, a small proportion of the monomer (and comonomer, if any is used) tend to remain associated (absorbed or dissolved) in the product polymer until the polymer is subjected to subsequent degassing. Such associated quantities or even higher quantities of absorbed or dissolved monomer/comonomer can readily be tolerated within the bed provided that these quantities do not adversely affect the fluidisation characteristics of the bed.

The process is particularly suitable for polymerising olefins at a pressure of between 0.5 and 6 MPa and at a temperature of between 30° C. and 130° C. For example for LLDPE production the temperature is suitable in the range 80°–90° C. and for HDPE the temperature is typically 85°–105° C. depending on the activity of the catalyst used.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. It is also possible to use a high-activity catalyst consisting essentially of a chromium oxide activated by a heat treatment and associated with a granular support based on a refractory oxide. The process is also suitable for use with metallocene catalysts and Ziegler catalysts supported on silica.

It is an advantage of the process according to the present invention that the improved cooling effect is particularly beneficial for polymerisation processes using highly active catalysts for example metallocene catalysts.

The catalyst may suitably be employed in the form of a prepolymer powder prepared beforehand during a prepolymerization stage with the aid of a catalyst as described above. The prepolymerization may be carried out by any suitable process, for example, polymerisation in a liquid hydrocarbon diluent or in the gas phase using a batch process, a semi-continuous process or a continuous process.

The preferred process according to the present invention is one wherein substantially the whole of the recycle gaseous stream is cooled and separated and wherein substantially the whole of the separated liquid is introduced into the fluidised bed.

In an alternative embodiment of the present invention the recycle gaseous stream is divided into a first stream and a second stream. The first stream is passed directly to the reactor in a conventional way by injection below the fluidisation grid and the second stream is cooled and the stream separated into a gas and a liquid stream. The gas stream may be returned to the first stream and reintroduced into the reactor below the bed, for example, below the fluidisation grid if such a grid is employed. The separated liquid is introduced into the fluidised bed according to the present invention.

The recycle gaseous stream is suitably cooled by means of a heat exchanger or exchangers to a temperature such that liquid is condensed in the gas stream. Suitable heat exchangers are well known in the art.

The gaseous stream leaving the top of the reactor can entrain a quantity of catalyst and polymer particles and these may be removed if desired from the recycle gaseous stream by means of a cyclone. A small proportion of these particles or fines may remain entrained in the recycle gaseous stream and, after cooling and separating the liquid from the gas, the fines can, if desired, be reintroduced into the fluidised bed together with the separated liquid stream.

The recycle gas stream may also comprise inert hydrocarbons used for the injection of catalyst, reaction activators or moderators into the reactor.

Make-up monomers for example ethylene to replace monomers consumed by the polymerisation reaction may be added to the recycle gas stream at any suitable location.

Condensable monomers, for example, butene, hexene, 4-methylpent-1-ene and octene, which can, for example, be used as comonomers for the production of LLDPE, or inert condensable liquids, for example, pentane, isopentane, butane and hexane, may be introduced as liquids.

Inert condensable liquids, for example, pentane may for example be injected into the recycle gaseous stream between the heat exchanger and the separator. For the preparation of LLDPE, the comonomer, for example, butene can, if desired, be injected into the recycle gaseous stream before passage to the heat exchanger.

Suitable means for separating the liquid are for example cyclone separators, large vessels which reduce the velocity of the gas stream to effect separation (knock-out drums), demister type gas-liquid separators and liquid scrubbers, for example, venturi scrubbers. Such separators are well known in the art.

The use of a demister type of gas-liquid separator is particularly advantageous in the process of the present invention.

The use of a cyclone separator in the recycle gas stream, prior to the gas-liquid separator is preferred. This removes the majority of the fines from the gaseous stream leaving the reactor thereby facilitating the use of a demister separator and also reducing the possibility of fouling of the separator resulting in a more efficient operation.

A further advantage of using a demister type of separator is that the pressure drop within the separator can be lower than in other types of separators thereby enhancing the efficiency of the overall process.

A particularly suitable demister separator for use in the process of the present invention is a commercially available vertical gas separator known as a "Peerless" (Type DPV P8X). This type of separator uses the coalescence of liquid droplets on a vane arrangement to separate the liquid from the gas. A large liquid reservoir is provided in the bottom of the separator for collection of the liquid. The liquid reservoir enables the liquid to be stored thereby providing control over the discharge of the liquid from the separator. This type of separator is very efficient and gives substantially 100% separation of condensed liquid from the gas stream.

If desired, a filter mesh, or other suitable means, may be arranged in the liquid reservoir of the separator to collect any remaining fines present in the separated liquid.

The separated liquid is suitably introduced into the fluidised bed at or above the point at which the recycle gaseous stream being fed to the reactor has substantially reached the temperature of the recycle gaseous stream being withdrawn from the reactor. The introduction of the separated liquid may be at a plurality of points within this region of the fluidised bed and these may be at different heights within this region. The point or points of introduction of the liquid are arranged such that the local concentration of liquid does not adversely affect the fluidisation of the bed or the quality of the product, and to enable the liquid to disperse rapidly from each point and vaporise in the bed to remove the heat of polymerisation from the exothermic reaction. In this way the amount of liquid introduced for cooling purposes may much more closely approach the maximum loading that can be tolerated without disturbing the fluidisation characteristics of the bed and hence offers the opportunity to achieve enhanced levels of reactor productivity.

The liquid can, if desired, be introduced into the fluidised bed at different heights within the bed. Such a technique can facilitate improved control over comonomer incorporation. Controlled metering of liquid into the fluidised bed provides useful additional control over the temperature profile of the bed and, in the case that the liquid contains comonomer, provides useful control over the comonomer incorporation into the copolymer.

The liquid is preferably introduced into the lower part of the region of the fluidised bed at which the recycle gaseous stream has substantially reached the temperature of the gaseous stream being withdrawn from the reactor. Commercial processes for the gas fluidised bed polymerisation of olefins are generally operated under substantially isothermal, steady state conditions. However, although at least a major portion of the fluidised bed is maintained at the desired substantially isothermal polymerisation temperature, there normally exists a temperature gradient in the region of the bed immediately above the point of introduction of the cooled recycle gaseous stream into the bed. The lower temperature limit of this region wherein the temperature gradient exists is the temperature of the incoming cool recycle gas stream, and the upper limit is the substantially isothermal bed temperature. In commercial reactors of the type which employ a fluidisation grid, this temperature gradient normally exists in a layer of about 15 to 30 cm (6 to 12 inches) above the grid.

In order to gain the maximum benefit of the cooling of the separated liquid it is important that the liquid is introduced into the bed above the region where this temperature gradient exists, i.e. in the part of the bed which has substantially reached the temperature of the gaseous stream leaving the reactor.

The point or points of introduction of the liquid into the fluidised bed may for example be approximately 50–70 cm above the fluidisation grid.

In practice, the process according to the present invention may be carried out, for example, by first determining the temperature profile within the fluidised bed during polymerisation using, for example, thermocouples located in or on the walls of the reactor. The point or points of introduction of the liquid is/are then arranged to ensure that the liquid enters into the region of the bed at which the recycle gaseous stream has substantially reached the temperature of the gaseous stream being withdrawn from the reactor.

Figure 1A:
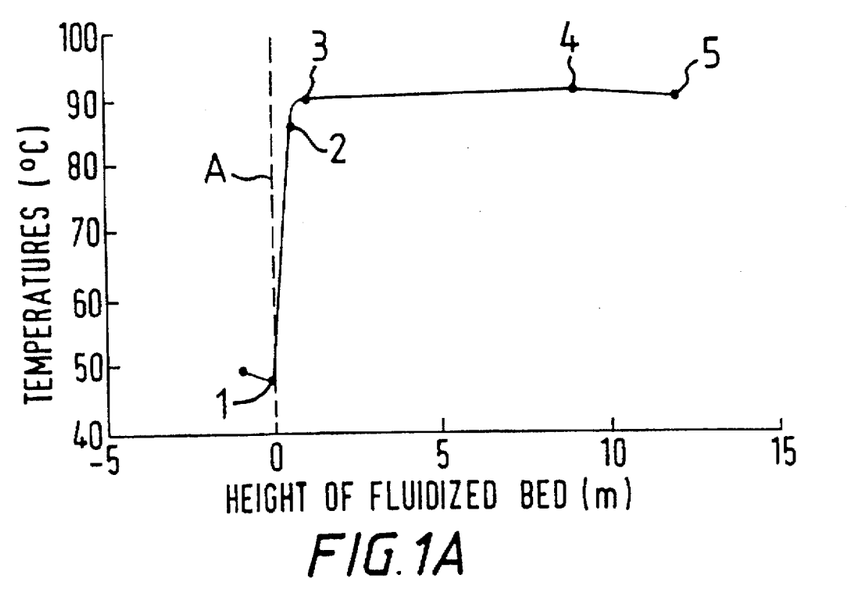
FIGS. 1A and 1B show, respectively, the temperature profile within a typical fluidized bed reactor suitable for use in a gas-phase polymerization of olefins and the location of the thermocouples in the walls of the reactor for measuring the temperature profile.

FIG. 1A represents the temperature profile within a typical fluidised bed reactor suitable for use in the gas-phase polymerisation of olefins.

Figure 1B:
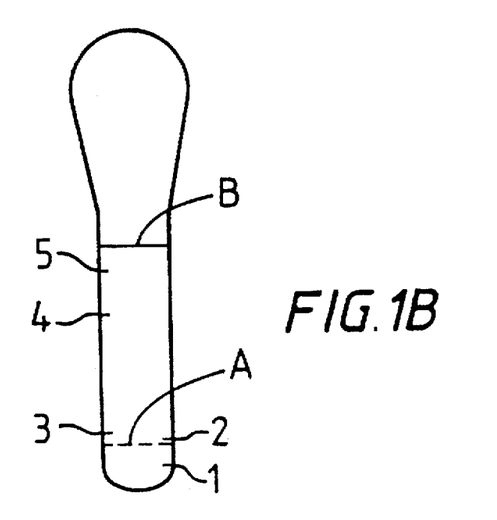

The temperature profile is shown in a fluidised bed used to prepare HDPE at a rate of 23.7 tonnes/hr. The temperatures were measured using thermocouples located on the walls of the reactor corresponding to different positions (1–5) within the fluidised bed. The locations of 1–5 in the fluidised bed reactor are shown in FIG. 1B.

The level of the fluidisation grid (A) and the top of the fluidised bed (B) are indicated on the temperature profile and the diagram. The temperature gradient referred to above can be seen as the region between position 1 and position 3. The region in which the recycle gaseous stream has substantially reached the temperature of the unreacted fluids leaving the reactor is shown as the region between position 3 and position 5. It is into this region that the separated liquid is introduced into the fluidised bed in accordance with the process according to the present invention.

The liquid is preferably introduced into the fluidised bed in the lower part of this region i.e. just above position 3 on the temperature profile in FIG. 1A.

By increasing the amount of liquid which may be introduced into the fluidised bed, higher levels of productivity may be achieved due to the increased cooling capacity. The space time yield can thereby be improved compared with other gas phase fluidised bed polymerisation processes.

A further advantage of the process of the present invention is that by introducing the liquid separately into the fluidised bed, accurate metering means can be employed to regulate the delivery of the liquid to the bed. This technique facilitates improved control of the cooling, and provides improved control over the delivery to the bed of any liquid comonomer fed in this manner. Thus the process of the present invention can be operated in a manner that does not rely, for example, on any need to maintain liquid entrained in the recycle gas stream. Consequently the quantity of liquid fed to the bed can be varied over much broader limits than hitherto. The improved control over the rate of addition to the bed of comonomer or inert hydrocarbons may, for example, be used to control the density of the polymer formed and the space time yield at which such polymer is formed.

It is important to ensure that the temperature within the fluidised bed is maintained at a level which is below the sintering temperature of the polyolefin constituting the bed.

The gas from the separator is recycled to the bed, normally into the bottom of the reactor. If a fluidisation grid is employed, such recycle is normally to the region below the grid, and the grid facilitates uniform distribution of the gas to fluidise the bed. The use of a fluidisation grid is preferred. Fluidisation grids suitable for use in the process of the present invention can be of conventional design, for example, a flat or dished plate perforated by a plurality of holes distributed more or less uniformly across its surface. The holes may for example be of diameter of about 5 mm.

The process of the present invention is operated with a gas velocity in the fluidised bed which must be greater than or equal to that required for fluidisation of the bed. The minimum gas velocity is generally approximately 6 cm/sec but the process of the present invention is preferably carried out using a gas velocity in the range 40 to 100, most preferably 50 to 70 cm/sec.

In the process according to the present invention the catalyst or prepolymer can, if desired, be introduced into the fluidised bed directly with the separated liquid stream. This technique can lead to improved dispersion of the catalyst or prepolymer in the bed.

If desired, liquid or liquid-soluble additives, for example, activators, cocatalysts and the like, can be introduced into the bed together with the condensed liquid by the process according to the present invention.

In the case that the process of the present invention is employed to make ethylene homo- or copolymers, make-up ethylene, for example, to replace the ethylene consumed during the polymerisation, may be advantageously introduced into the separated gas stream prior to its reintroduction into the bed (for example below the fluidisation grid if such is employed). By adding the make-up ethylene to the separated gas stream rather than into the recycle gaseous stream before separation, the quantity of liquid which may be recovered from the separator may be increased and the productivity improved.

The separated liquid stream may be subjected to additional cooling (e.g. using refrigeration techniques) before being introduced into the fluidised bed. This allows an even greater cooling effect in the bed than is provided by the liquid evaporative effect (latent heat of evaporation) alone, thereby providing further potential increases in productivity of the process. Cooling of the separated liquid stream may be achieved by use of suitable cooling means e.g. a simple heat exchanger or refrigerator located between the separator and the reactor. A further advantage of this particular aspect of the present invention is that, by cooling the liquid before introduction into the fluidised bed, any tendency for catalyst or prepolymer which may be contained in the liquid stream to cause polymerisation before introduction into the bed will be reduced.

The liquid may be introduced into the fluidised-bed by suitably arranged injection means. A single injection means may be used or a plurality of injection means maybe arranged within the fluidised bed.

A preferred arrangement is to provide a plurality of injection means substantially equally spaced in the fluidised bed in the region of the introduction of the liquid. The number of injection means used is that number which is required to provide sufficient penetration and dispersion of liquid at each injection means to achieve good dispersion of liquid across the bed. A preferred number of injection means is four.

Each of the injection means may, if desired, be supplied with the separated liquid by means of a common conduit suitably arranged within the reactor. This can be provided, for example, by means of a conduit passing up through the centre of the reactor.

The injection means are preferably arranged such that they protrude substantially vertically into the fluidised bed, but may be arranged such that they protrude from the walls of the reactor in a substantially horizontal direction.

The rate at which the liquid can be introduced into the bed depends primarily on the degree of cooling desired in the bed, and this in turn depends on the desired rate of production from the bed. The rates of production obtainable from commercial fluidised bed polymerisation processes for the polymerisation of olefins depend, inter alia on the activity of the catalysts employed, and on the kinetics of such catalysts. Thus for example, when catalysts having very high activity are employed, and high production rates are desired, the rate of liquid addition will be high. Typical rates of liquid introduction may be, for example, in the range 0.3 to 4.9 cubic meters of liquid per cubic meter of bed material per hour, or even higher. For conventional Ziegler catalysts of the "superactive" type (i.e. those based on transition metal, magnesium halide and organometallic cocatalyst), the rate of liquid addition may be, for example, in the range 0.5 to 1.5 cubic meters of liquid per cubic meter of bed material per hour.

In the process of the present invention the weight ratio of liquid:total gas which may be introduced into the bed can be for example in the range 1:100 to 2:1, preferably in the range 5:100 to 85:100, most preferably in the range 6:100 to 25:100. By total gas is meant the gas which is returned to the reactor to fluidise the bed together with any gas used to assist in the operation of the injection means, e.g. atomising gas.

By injecting the liquid into the fluidised bed in this way any catalyst which is present in the liquid may benefit from the localised cooling effect of the liquid penetration surrounding each injection means which may avoid hot spots and consequent agglomeration.

Any other suitable injection means may be used provided the penetration and dispersion of the liquid into the bed from such means is sufficient to achieve a good dispersion of liquid across the bed.

The preferred injection means is a nozzle or a plurality of nozzles which include gas-induced atomising nozzles in which a gas is used to assist in the injection of the liquid, or liquid-only spray-type nozzles.

According to another aspect of the present invention there is provided a continuous gas fluidised bed process for the polymerisation of olefin monomer selected from (a) ethylene, (b) propylene (c) mixtures of ethylene and propylene and (d) mixtures of a, b or c with one or more other alpha-olefins in a fluidised bed reactor by continuously recycling a gaseous stream comprising at least some of the ethylene and/or propylene through a fluidised bed in said reactor in the presence of a polymerisation catalyst under reactive conditions, at least part of the said gaseous stream withdrawn from said reactor being cooled to a temperature at which liquid condenses out, separating at least part of the condensed liquid from the gaseous stream and introducing the liquid directly into the fluidised bed by one or more liquid-only nozzles or gas-induced atomising nozzles. The fluidised bed is preferably supported above a fluidisation grid.

The injection means are suitably nozzles which protrude into the bed through the reactor wall (or through a supporting grid for the bed) and which carry one or more jet outlets to deliver the liquid to the bed.

It is important in the process of the present invention to achieve good dispersion and penetration of the liquid in the bed. Factors which are important in achieving good penetration and dispersion are the momentum and direction of the liquid entering the bed, the number of points of introduction of the liquid per unit crossectional area of the bed, and the spatial arrangement of the points of introduction of the liquid.

A further aspect of the present invention provides a process for the polymerisation of olefin monomer, the olefin monomer preferably being selected from (a) ethylene, (b) propylene (c) mixtures of ethylene and propylene and (d) mixtures of a, b or c with one or more other alpha-olefin olefins, in a fluidised bed reactor by continuously recycling a gaseous stream comprising the monomer, preferably comprising at least the ethylene and/or propylene, through a fluidised bed in said reactor in the presence of a polymerisation catalyst under reactive conditions, at least part of the said gaseous stream withdrawn from said reactor being cooled to a temperature at which liquid condenses out, separating at least part of the condensed liquid from the gaseous stream and introducing at least part of the separated liquid directly into the fluidised bed at or above the point at which the gaseous stream passing through the fluidised bed has substantially reached the temperature of the gaseous stream being withdrawn from the reactor, said liquid being introduced into said reactor as one or more jets of liquid alone, or one or more jets of liquid and gas, from one or more jet outlets, each jet having a horizontal momentum flux in the case of the liquid only jets of at least $100 \times 10^3$ Kg s$^{-1}$ m$^{-2}$×m s$^{-1}$ and in the gas/liquid jets of 200 Kg s$^{-1}$ m$^{-2}$×m s$^{-1}$ wherein the horizontal momentum flux is defined as the mass flow rate of liquid (kilogrammes per second) in the horizontal direction per unit crossectional area (square meters) of the jet outlet from which it emerges, multiplied by the horizontal component of the velocity (meters per second) of the jet.

Preferably the momentum flux of each of the liquid or liquid/gas jets is at least $250 \times 10^3$ and most preferably at least $300 \times 10^3$ Kg s$^{-1}$ m$^{-2}$×m s$^{-1}$. Particularly preferred is the use of a horizontal momentum flux in the range $300 \times 10^3$ to $500 \times 10^3$ Kg s$^{-1}$ m$^{-2}$×m s$^{-1}$. In the case that the liquid jet emerges from the jet outlet in a direction other than horizontal, the horizontal component of the velocity of the jet is calculated from Cosine Q°×actual jet velocity, wherein Q° is the angle the jet makes with the horizontal.

The direction of motion of the one or more liquid or liquid/gas jets into the bed is preferably substantially horizontal. In the case that one or more of the jet outlets deliver the liquid or liquid/gas jets in a direction other than horizontal, preferably these are directed at an angle not greater than 45°, most preferably not more than 20° to the horizontal.

The one or more nozzles are suitably each equipped with one or more jet outlets. The number of nozzles, and the number and distribution of the jet outlets are important factors in obtaining good distribution of liquid within the bed. If a plurality of nozzles are employed, they are preferably vertically disposed and spaced horizontally and substantially equidistant from one another. In this case, they are also preferably spaced equidistant from one another and from the vertical wall of the fluidised bed. The number of nozzles per 10 square meters of the horizontal crossectional area of the bed is preferably in the range 1 to 4, most preferably in the range 2 to 3. Where the calculated number is not an integer, it is preferably rounded up to an integer. The number of jet outlets in each nozzle is preferably in the range 1 to 40 most preferably in the range 3 to 16. In the case that the nozzle contains more than one jet outlet, the jet outlets are preferably arranged circumferentially and equidistant from one another around the nozzle.

As indicated above, the jets of liquid may consist solely of liquid or may comprise a liquid/gas mixture. Such gas may be merely carried in the liquid,. or may be employed to atomise the liquid, or to provide motive force to propel the liquid.

A suitable gas-induced atomising nozzle for use in the process according to the present invention comprises (a) at least one inlet for a pressurised liquid,
(b) at least one inlet for an atomising gas,
(c) a mixing chamber to mix said liquid and gas, and
(d) at least one outlet through which said mixture is discharged.

The atomising gas may suitably be an inert gas for example nitrogen but is preferably make-up ethylene.

Each nozzle may be provided with a plurality of outlets of suitable configuration. The outlets may for example comprise circular holes, slots, ellipsoids or other suitable configurations. Each nozzle may comprise a plurality of outlets of varying configuration.

The size of the outlets is preferably such that there is little pressure drop through the outlets.

The outlets are preferably symmetrically arranged around the circumference of each nozzle but may also be arranged asymmetrically therein.

The atomising gas supply to each nozzle is maintained at a pressure sufficient to break the liquid into small droplets and to prevent particle ingress from the fluidised bed or particle blockage of the outlets of the nozzle.

The relative size of the mixing chamber is arranged to ensure optimum atomisation. The volume of the mixing (atomising) chamber relative to the volume of liquid passing through the chamber expressed as: Volume of mixing chamber (in cubic cm)/Liquid flowrate (cubic cm per second), is preferably in the range $5 \times 10^{-3}$ to $5 \times 10^{-1}$ seconds.

The velocity of the liquid is preferably maintained at a velocity sufficient to ensure that any particles, for example fines, do not separate out of the liquid stream.

The weight ratio of atomising gas to liquid supplied to each nozzle is typically in the range 5:95 to 25:75.

Figure 2:
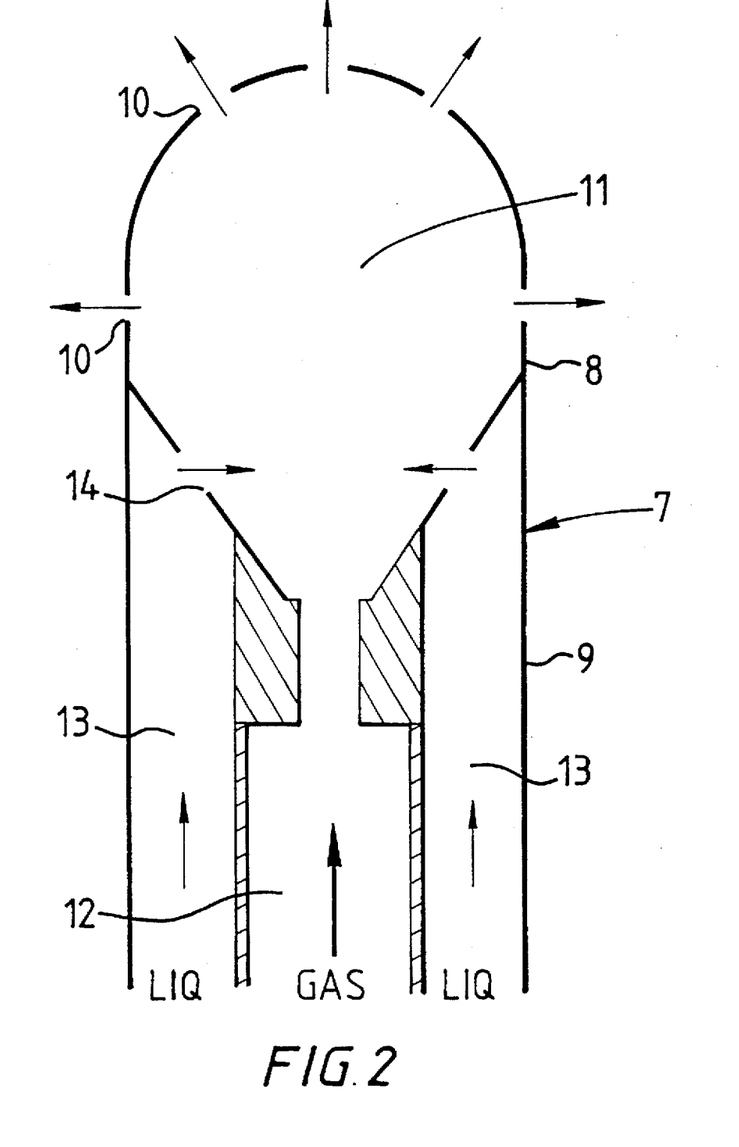
FIG. 2 shows a nozzle suitable for use in the polymerization process of the present invention.

FIG. 2 represents a nozzle suitable for use in the process according to the present invention.

In the Figure the nozzle comprises a housing 7 comprising an upper region 8 and a lower region 9. The upper region is provided with a number of outlets 10 arranged on its circumference and a mixing chamber 11 arranged therein. The lower region is provided with a centrally located conduit 12 opening into the mixing chamber and an outer conduit 13 located around the inner conduit. The conduit 13 communicates with the mixing chamber by suitably arranged openings 14. Pressurised liquid is supplied to the nozzle by conduit 13 and atomising gas is supplied to conduit 12. The lower region of the nozzle 9 is connected by conventional means to a supply of pressurised liquid and atomising gas. After mixing with the gas in the chamber 11 the liquid is discharged from the nozzle via the outlets 10 as an atomised spray.

A preferred gas-induced atomiser nozzle is one wherein the outlets comprise a series of substantially horizontal slots arranged around the circumference of the nozzle. The nozzle may also comprise a vertically orientated hole or holes located to ensure that any particles adhering to the top of the nozzle may be removed by the pressurised gas-liquid mixture.

The slots may typically be of a size equivalent to a hole of diameter of about 6.5 mm and may for example be of dimension 0.75 mm×3.5 mm.

The injection means may alternatively comprise liquid-only spray-type nozzle or nozzles.

A suitable liquid-only spray nozzle for use in the process according to the present invention comprises at least one inlet for pressurised liquid and at least one outlet for said pressurised liquid, sufficient liquid pressure being maintained within the nozzle to ensure that the liquid emerging from the outlet has the desired momentum flux.

The pressure drop in each nozzle can be regulated if desired, for example, by the use of restrictive devices such as valves.

The outlets may comprise similar configurations as defined above for the gas-induced atomiser nozzles. The preferred configuration for the outlets in the liquid spray nozzle is circular holes. The holes are preferably of diameter in the range 0.5 to 5 mm., most preferably in the range 0.5 to 2.5 mm.

The droplet size of the liquid is influenced by a number of factors in particular in the gas-induced atomiser nozzles by the ratio of the liquid to atomising gas supplied to the nozzle and the size and configuration of the atomising chamber. A desirable liquid droplet size for a gas-induced atomiser nozzle is from about 50 micron to about 1000 microns. In the case of the liquid spray nozzles the liquid droplet size is influenced primarily by the pressure drop in the nozzle and the size and configuration of the outlets. A desired liquid droplet size for the liquid spray nozzle is from about 2000 microns to about 4000 microns. Such droplets can be generated, for example, by disruption of a liquid jet by the motion of the solid particles forming the bed.

The pressure drop in either type of nozzle must be sufficient to prevent the ingress of particles from the fluidised bed. In the gas-induced atomiser nozzle the pressure drop is suitably in the range 2 to 7, preferably 3 to 5 bar and, in the liquid spray nozzles in the range 2 to 7, preferably 4 to 5 bar.

In the event of a failure in the supply of liquid and/or atomising gas to either of the nozzles suitable means are arranged to provide for an emergency gas purge to prevent blockage of the nozzle by the ingress of particles from the fluidised bed. A suitable purging gas is nitrogen.

It is important that the outlets of the gas-induced atomising nozzles or the liquid-only nozzles are of sufficient size to allow for the passage of any fines which may be present in the separated liquid stream.

In either type of nozzle the outlets may be arranged at different levels within each nozzle. For example the outlets may be arranged in a series of rows.

In the type of nozzle illustrated in FIG. 2, the number of outlets on each nozzle is preferably between 4 and 40, for example between 20 and 40, most preferably from 4 to 16. The diameter of such a nozzle is preferably in the range 4 to 30 cm, e.g. 10 to 30 cm, and is most preferably of approximately 7 to 12 cm.

Other types of nozzle may also be suitable for use in the process of the present invention for example ultrasonic nozzles.

Before commencing the introduction of liquid by use of the process according to the present invention the gas phase fluidised bed polymerisation maybe started in a conventional manner for example by charging the bed with particulate polymer particles and then initiating the gas flow through the bed.

When appropriate the liquid may be introduced into the bed, for example using the injection means described above. During start-up the atomising gas supply to the gas-induced nozzles or the purging gas flow to the liquid spray nozzles must be maintained at a velocity sufficient to prevent the ingress of particles into the outlets of the nozzles.

Processes according to the present invention will now be illustrated with reference to the accompanying drawings.

Figure 3:
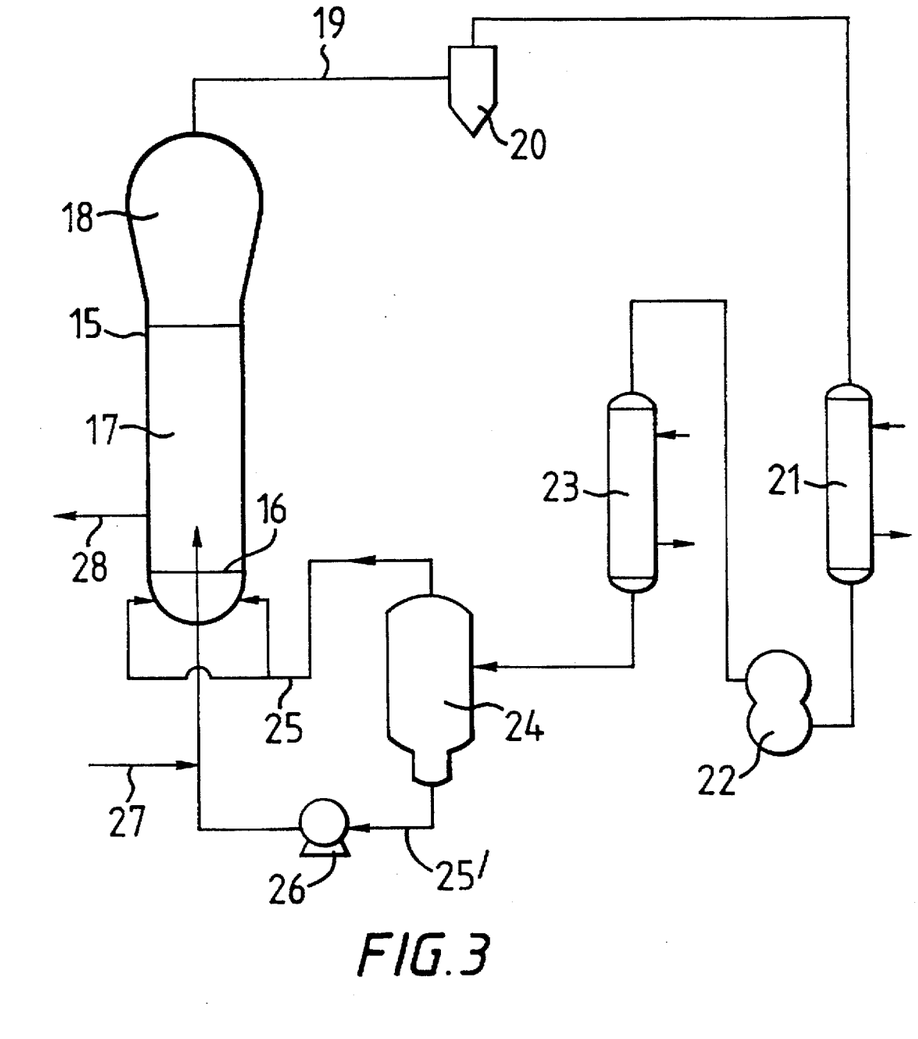
FIG. 3 shows diagrammatically a gas-phase fluidized bed polymerization process according to the present invention.
Figure 4:
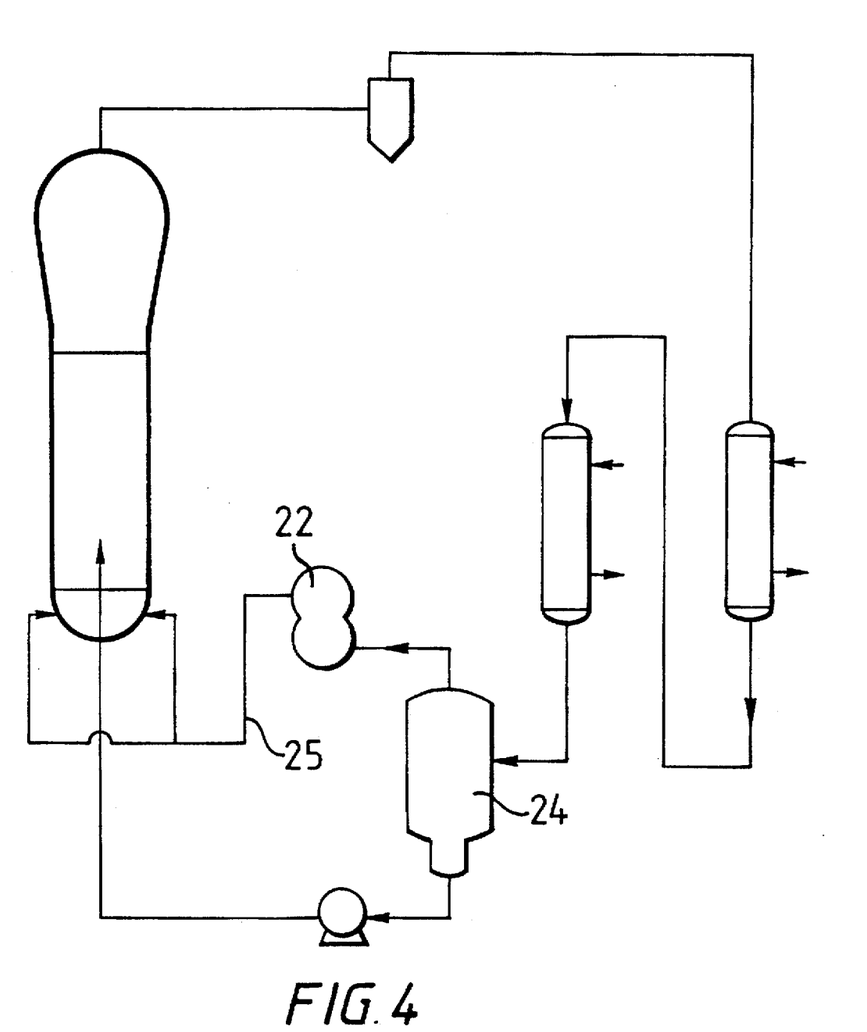
FIG. 4 shows diagrammatically an alternative arrangement for the polymerization process.
Figure 5:
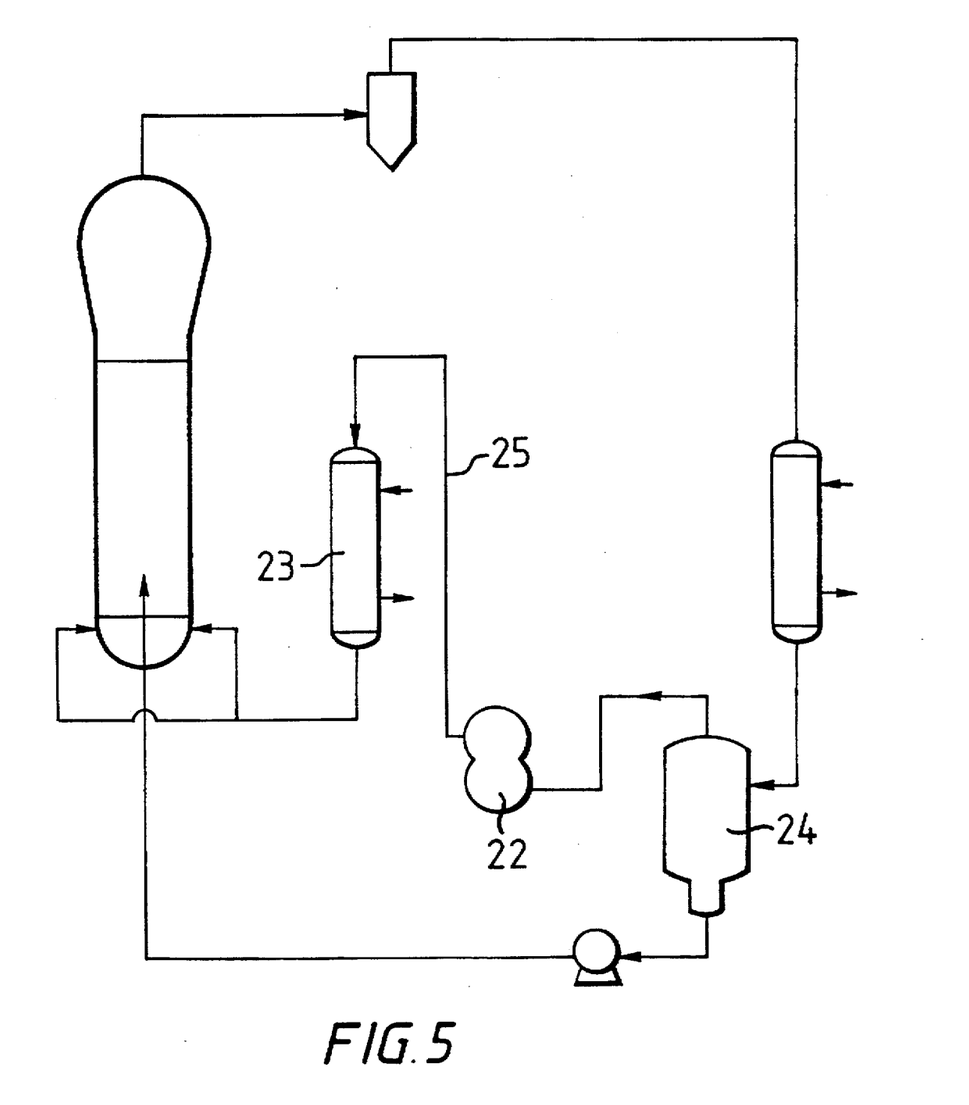
FIG. 5 shows yet a further arrangement for the polymerization process.

FIGS. 3–5 show diagrammatically processes according to the present invention.

FIG. 3 illustrates a gas-phase fluidised bed reactor consisting essentially of a reactor body 15 which is generally an upright cylinder having a fluidisation grid 16 located in its base. The reactor body comprises a fluidised bed 17 and a velocity reduction zone 18 which is generally of increased cross-section compared to the fluidised bed.

The gaseous reaction mixture leaving the top of the fluidised bed reactor constitutes recycle gaseous stream and is passed via line 19 to a cyclone 20 for the separation of the majority of the fines. Removed fines may suitably be returned to the fluidised bed. The recycle gaseous stream leaving the cyclone passes to a first heat exchanger 21 and a compressor 22. A second heat exchanger 23 is present to remove the heat of compression after the recycle gaseous stream has passed through the compressor 22.

The heat exchanger or exchangers can be arranged either upstream or downstream of the compressor 22.

After cooling and compression to a temperature such that a condensate is formed, the resultant gas-liquid mixture is passed to the separator 24 where the liquid is removed.

The gas leaving the separator is recycled via line 25 to the bottom of the reactor 15. The gas is passed via the fluidisation grid 16 to the bed thereby ensuring that the bed is maintained in a fluidised condition.

The separated liquid from the separator 24 is passed via line 25' to the reactor 15. If necessary a pump 26 may be suitably located in line 25'.

Catalyst or prepolymer are fed to the reactor via line 27 into the separated liquid stream.

Product polymer particles may be suitably removed from the reactor via line 28.

The arrangement shown in FIG. 3 is particularly suitable for use when retrofitting existing gas phase polymerisation reactors using fluidised bed processes.

FIG. 4 illustrates an alternative arrangement for performing the process of the present invention. In this arrangement the compressor 22 is located in line 25 after separation of the recycle gaseous stream by the separator 24. This has the advantage that the compressor has a reduced quantity of gas to compress and can therefore be of reduced size achieving a better process optimisation and cost.

FIG. 5 illustrates a further arrangement for performing the process of the present invention whereby the compressor 22 is again arranged in line 25 after the separator 24 but before the second heat exchanger 23 which is located in the separated gas stream rather than located before the separator. Again this arrangement gives a better process optimisation.

The process according to the present invention will now be further illustrated with reference to the following Examples.

EXAMPLES 1 TO 11

Computer generated Examples were obtained for the simulated polymerisation of olefins in a gas-phase fluidised bed reactor under conditions according to the present invention (Examples 1 to 5, 9 and 10) and for comparison under conventional conditions with no separated liquid in the recycle stream (Examples 6 to 8 and 11).

Examples 1 to 8 represent copolymerisations of ethylene with a variety of alpha-olefins using a conventional Ziegler catalyst and Examples 9 to 11 represent homopolymerisation of ethylene using a conventional silica supported chromium oxide catalyst.

The space time yield and the reactor inlet temperature were computed using a heat balance computer program with an accuracy of ±15%. The dew point temperature and the rate of flow of the recycled liquid were computed for the polymerisation system using a conventional software program with an accuracy of about ±10%.

Examples 1, 3, 4 and 10 most closely represent typical process conditions for performing the process according to the present invention.

The results are given in Table 1 and Table 2 and clearly show improved space time yields obtainable using the process of the present invention.

The "% Liquid in Recycled Stream" in Tables 1 and 2 represents, as a percentage, the total weight of liquid recycled through the injection means divided by the total weight of gas (recycle gas plus any atomising gas).

EXAMPLES 12 TO 15

Figure 6:
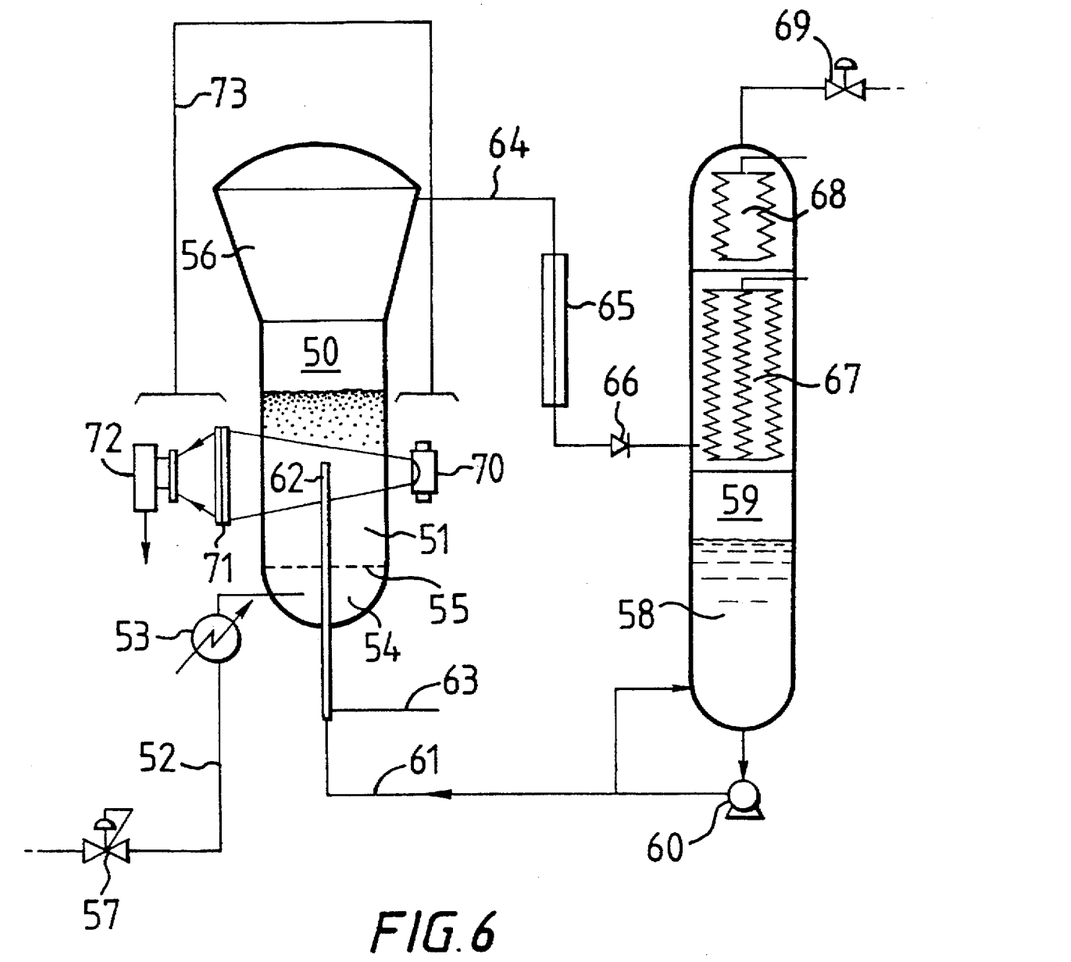
FIG. 6 shows diagrammatically an experimental rig for testing the introduction of fluid into a fluidised bed reaction according to the present invention.

An experimental rig was used to test the introduction of liquid into a fluidised bed by use of injection means as described above. The arrangement of the test rig is shown in FIG. 6. The test rig comprises an aluminium fluidisation vessel 50 having a velocity reduction zone 56 containing a bed 51 of polyethylene powder (high density or linear low density polyethylene), previously prepared by gas fluidised bed polymerisation of ethylene in an industrial scale gas fluidised bed plant. The bed 51 was fluidised by passing a continuous stream of dry nitrogen gas through line 52 and preheater 53 into the base chamber 54 of vessel 50, and thence into the bed through grid 55. The nitrogen gas was supplied from a commercial liquid nitrogen supply tank, and the quantity of nitrogen supplied to fluidise the bed and the gas pressure in the system were controlled by means of valves 57 and 69, the volume flow rate being determined using a conventional turbine meter (not shown). The preheater unit had a nominal heating capacity of 72 kW which was controllable to heat the nitrogen gas to the desired temperature. Volatile liquid hydrocarbon 58 (1-hexene or n-pentane) was introduced into the fluidised bed 51 from a cooler/demister tank 59 by means of a pump 60 and line 61. The volatile liquid hydrocarbon entered the bed through nozzle/jet outlet arrangement 62 which penetrated into the bed. Various nozzle/jet outlet arrangements were tested, some being of the liquid-only type, and others being of the gas atomising type. For the latter type, atomising gas was introduced through line 63 (for an example of this type of nozzle, see FIG. 2 of the accompanying drawings). Volatile liquid hydrocarbon entering the fluidised bed through the nozzle/jet outlet arrangement 62 evaporated in the bed thus causing cooling by absorbing latent heat of evaporation. The nitrogen fluidising gas and the accompanying volatilised liquid hydrocarbon emerged from the top of the bed into the velocity reduction zone 56 wherein the bulk of any polyethylene powder entrained in the gas stream fell back into the bed. The gas then passed into line 64, filter unit 65 and through non-return valve 66 into the cooler/demister tank 59. The cooler/demister tank 59 contained two heat exchangers 67, 68. Heat exchanger 67 was cooled by passage therethrough of cold water, and 68 was cooled by circulating a refrigerated ethylene glycol/water antifreeze solution. Passage of the gas over the heat exchangers 67, 68 cooled the gas and caused the liquid hydrocarbon (hexene or pentane) to condense out. The condensed hydrocarbon collected in the base of tank 59, from whence it was recycled back to the bed. The nitrogen gas thus substantially freed from hydrocarbon was then passed through back-pressure regulating valve 69 to the atmosphere. The fluidisation and vaporisation of the liquid hydrocarbon in the bed was monitored using commercially available X-ray imaging apparatus comprising an X-ray source 70, an image intensifier 71 and a CCD (charge coupled device) video camera 72 the output of which was continuously recorded on a video tape recorder (not shown). The X-ray source, image intensifier and video camera were mounted on a moveable gantry 73 to enable the field of view of the bed to be changed at will.

The process of the present invention provides substantial improvements in productivity of gas fluidised bed polymerisation processes over existing processes. The process of the present invention can be employed in new plant or can be employed in existing plant to obtain substantial increases in productivity and better control of liquid addition to the bed. In the case of the installation of new plant, substantial reductions in capital costs can be achieved by using smaller reaction vessels, compressors and other ancillary equipment than would have been necessary to achieve comparable productivities from conventional plant. In the case of existing plant, modification of such plant in accordance with the present invention provides substantial increases in productivity and improved control of the process.

The results of the tests are shown in Table 3 wherein Examples 12, 14 and 15 are in accordance with the present invention, and Example 13 is by way of comparison. Example 12 and Comparative Example 13 illustrate the use of the same nozzle arrangement, but in the Comparative Example, the addition of liquid to the "cold" zone of a gas fluidised bed polymerisation is simulated by running the bed at 45° C. in comparison with the 98° C. employed in Example 12. Under these circumstances lumps of polymer wet with liquid hydrocarbon formed around the nozzle. Examples 12, 14 and comparative Example 13 employed gas induced atomising nozzles, and Example 15 a liquid only nozzle. Examples 12, 14 and 15 all produced good penetration and dispersion of the liquid hydrocarbon, the liquid penetration being stopped only by the vessel wall. In Comparative Example 13, liquid penetration was inhibited by the formation of agglomerated lumps of polymer/liquid hydrocarbon

TABLE 1

| Example Product | 1 C2/C4 Copolymer | 2 C2/C4 Copolymer | 3 C2/C6 Copolymer | 4 C2/C6 Copolymer | 5 C2/C4 Copolymer | 6 C2/C4 Copolymer |
|---|---|---|---|---|---|---|
| Reactor Pressure (bar) | 24 | 26 | 24 | 24 | 26 | 24 |
| Reactor Temperature (°C.) | 93 | 93 | 82 | 82 | 76 | 93 |
| Process Gas (% mol) | | | | | | |
| Ethylene | 37.5 | 42.3 | 29.1 | 31.2 | 55.8 | 28.5 |
| Ethane | 14.8 | 18.5 | 15.9 | 14.2 | 3.1 | 25.2 |
| Hydrogen | 26.2 | 29.6 | 4.9 | 10 | 11.1 | 19.9 |
| Nitrogen | 9.3 | 6 | 39.1 | 35 | 5.7 | 24.3 |
| Butene | 0.2 | 8.2 | | | 18.6 | 8.14 |

TABLE 1-continued

| Example<br>Product | 1<br>C2/C4 Copolymer | 2<br>C2/C4 Copolymer | 3<br>C2/C6 Copolymer | 4<br>C2/C6 Copolymer | 5<br>C2/C4 Copolymer | 6<br>C2/C4 Copolymer |
|---|---|---|---|---|---|---|
| Pentane | 10.4 | 10 | 1 | 1 | 5.4 | |
| Hexene | | | | 5.3 | | |
| 4-MP1 | | | 7.7 | | | |
| Others eg oligomers | 1.6 | 1.4 | 2.3 | 3.3 | 0.3 | 1.96 |
| Gas Velocity (cm/sec) | 60 | 60 | 60 | 60 | 60 | 60 |
| Bed Height (meters) | 14.5 | 14.5 | 14.5 | 14.5 | 14.5 | 14.5 |
| Space Time Yield (Kg/m³h) | 140 | 193 | 105 | 116 | 193 | 74 |
| Reactor Inlet Temperature (°C.) | 46.5 | 36.2 | 53.4 | 48.8 | 44.8 | 49.9 |
| Dew Point Temperature (°C.) | 70.9 | 78.9 | 67.7 | 69.5 | 61.6 | 46.1 |
| % Liquid in Recycled Stream | 14.4 | 21.5 | 11 | 11.3 | 21.3 | 0 |

TABLE 2

| Example<br>Product | 7<br>C2/C4 Copolymer | 8<br>C2/C4 Copolymer | 9<br>C2 Homopolymer | 10<br>C2 Homopolymer | 11<br>C2 Homopolymer |
|---|---|---|---|---|---|
| Reactor Pressure (bar) | 24 | 24 | 24 | 24 | 20 |
| Reactor Temperature (°C.) | 74 | 76 | 103 | 103 | 103 |
| Process Gas (% mol) | | | | | |
| Ethylene | 36.7 | 37.5 | 29.1 | 29.1 | 35 |
| Ethane | 7.4 | 9.7 | 16.4 | 17 | 17.5 |
| Hydrogen | 8.4 | 7.5 | 12.5 | 12.5 | 15 |
| Nitrogen | 24.3 | 31.9 | 24.4 | 25.6 | 28.1 |
| Butene | 19.3 | 12.15 | | | |
| Pentane | | | 13.3 | 11.2 | |
| Hexene | | | | | |
| 4-MP1 | | | | | |
| Others eg oligomers | 3.9 | 1.25 | 4.3 | 4.6 | 4.4 |
| Gas Velocity (cm/sec) | 60 | 60 | 60 | 60 | 60 |
| Bed Height (meters) | 14.5 | 14.5 | 14.5 | 14.5 | 14.5 |
| Space Time Yield (Kg/m³h) | 55 | 55 | 193 | 178 | 75 |
| Reactor Inlet Temperature (°C.) | 50.1 | 49.7 | 36.4 | 36.1 | 57 |
| Dew Point Temperature (°C.) | 38.2 | 23.5 | 62.3 | 56.3 | −44.5 |
| % Liquid in Recycled Stream | 0 | 0 | 21 | 15.7 | 0 |

TABLE 3

| EXAMPLE | 12 | 13 | 14 | 15 |
|---|---|---|---|---|
| Nozzle type | Gas atomising | Gas atomising | Gas atomising | Liquid-only |
| Outlet type | 4 horizontal slots | 4 horizontal slots | 4 horizontal slots | 2 holes of 1.75 mm diam. |
| Location above grid (cm) | 52 | 52 | 10 | 52 |
| Fluidising gas velocity (cm/s) | 45 | 42 | 52 | 38 |
| Bed temp. °C. | 98 | 45 | 78 | 97 |
| Pressure (MPa) | 1.01 | 0.97 | 0.78 | 0.75 |
| Bed material | HDPE BP Grade 6070 | HDPE BP Grade 6070 | LLDPE BP Grade 0209 | HDPE BP Grade 6070 |
| Bed charge (Kg) | 60 | 58.5 | 61.2 | 58.0 |
| Liquid | hexene | hexene | n-pentane | hexene |
| Liquid flow (M³/h) | 1.65 | 1.48 | 1.78 | 0.69 |
| Liquid pressure to nozzle (MPa) | 0.33 | 0.32 | 0.38 | 0.54 |
| N₂ atomising gas pressure (MPa) | 0.42 | 0.40 | 0.45 | none |
| Atomising gas: liquid (mass %) | 5.4 | 5.3 | 5.6 | none |
| M³ liquid per M³ bed per hour | 11.38 | 10.61 | 12.80 | 4.95 |
| Horizontal penetration of liquid (cm) | greater than 21 | less than 15 | greater than 21 | greater than 21 |
| % Condensed liquid (% total liquid/total gas) | 105.5 | 94.6 | 121.2 | 46.6 |

We claim:

1. A fluidized bed polymerization reactor which comprises:
   (a) an upright cylindrical vessel having a longitudinal axis;
   (b) a fluidization grid located in said vessel substantially perpendicular to said longitudinal axis of said vessel and defining a fluidized bed region above said fluidization grid;
   (c) inlet means for continuously introducing a gaseous stream of polymerizable monomers into said vessel below said fluidization grid at a gas velocity sufficient to maintain particles in said fluidized bed region in a suspended and fluidized condition;
   (d) means for introducing polymerization catalyst into said fluidized bed region;
   (e) means for removing polymer product from said fluidized bed region;
   (f) outlet means for continuously removing an outlet stream of gaseous unreacted polymerizable monomer from said fluidized bed region;
   (g) cooling means for receiving and cooling at least a part of the outlet stream to a temperature at which liquid condenses out of the outlet stream;
   (h) separating means for separating at least a part of the cooled outlet stream into condensed liquid and a cooled gaseous stream;
   (i) means for recycling the separated cooled gaseous stream to the inlet means; and
   (j) an injection means for injecting at least a part of the condensed liquid into the fluidized bed region at a point where the gaseous stream of polymerizable monomers passing through the vessel has substantially reached the operating temperature of the polymerization reactor;
   wherein said injection means comprises at least one gas induced atomizing nozzle for injecting an atomized stream of the condensed liquid into said fluidized bed region in a direction substantially perpendicular to the longitudinal axis of said vessel.

2. The fluidized bed polymerization reactor of claim 1, wherein the cooling means receives and cools substantially all of the outlet stream from the outlet means.

3. The fluidized bed polymerization reactor of claim 1 or 2, wherein the separating means separates substantially all of the cooled outlet stream into condensed liquid and a cooled gaseous stream.

4. The fluidized bed polymerization reactor of claim 3, wherein the injection means injects substantially all of the condensed liquid into the fluidized bed region as an atomized stream of condensed liquid.

5. The fluidized bed polymerization reactor of claim 1, wherein the injection means injects the atomized stream of condensed liquid into the fluidized bed region at a rate in the range of from 0.3 to 4.9 cubic meters of liquid per hour per cubic meter of fluidized bed region.

6. The fluidized bed polymerization reactor of claim 1, wherein the injection means comprises a plurality of gas induced atomizing nozzles each of which inject an atomized stream of condensed liquid into the fluidized bed region.

7. The fluidized bed polymerization reactor of claim 1, wherein the separating means is a demister gas-liquid separator.

8. The fluidized bed polymerization reactor of claim 7, including a cyclone separator before the separating means for separating fines from the outlet stream.

9. The fluidized bed polymerization reactor of claim 1, wherein the injection means injects the atomized stream of condensed liquid into the fluidized bed region at a height of at least 50 cm above the fluidization grid.

10. The fluidized bed polymerization reactor of claim 9, wherein the injection means injects the atomized stream of condensed liquid into the fluidized bed region at a height of from 50 to 70 cm above the fluidization grid.

11. The fluidized bed polymerization reactor of claim 1, wherein the fluidization grid is a perforated plate having a plurality of holes distributed substantially uniformly across the surface of the plate.

12. The fluidized bed polymerization reactor of claim 1, wherein the means for introducing the polymerization catalyst comprises a conduit communicating with the injection means so that the polymerization catalyst is introduced into the fluidized bed region with the atomized stream of condensed liquid.

13. The fluidized bed polymerization reactor of claim 1, including means for introducing liquid or liquid-soluble additives into the fluidized bed region by the injection means with the atomized stream of condensed liquid.

14. The fluidized bed polymerization reactor of claim 1, including additional cooling means for cooling further the separated condensed liquid before it is injected into the fluidized bed region.

15. The fluidized bed polymerization reactor of claim 6, wherein the plurality of gas induced atomizing nozzles are equally spaced in the fluidized bed region from each other and from an inner wall of the vessel in a direction substantially perpendicular to the longitudinal axis of the vessel.

16. The fluidized bed polymerization reactor of claim 15, including from two to four nozzles in the fluidized bed region.

17. The fluidized bed polymerization reactor of claim 15, wherein each nozzle includes a mixing chamber, a conduit for supplying condensed liquid to the mixing chamber, a conduit for supplying atomizing gas to the mixing chamber and a plurality of outlets communicating with the mixing chamber for injecting the condensed liquid as a plurality of atomized sprays into the fluidized bed region in a direction substantially perpendicular to the longitudinal axis of the vessel.

18. The fluidized bed polymerization reactor of claim 17, wherein the conduits are coaxial, the condensed liquid conduit being located around the atomizing gas conduit, the coaxial conduits protruding substantially vertically up through the fluidization grid and into the fluidized bed region so that the mixing chamber and outlets are located in said fluidized bed region.

19. The fluidized bed polymerization reactor of claim 17, wherein the plurality of outlets are horizontally extending slots arranged equidistantly around the circumference of the mixing chamber.

20. The fluidized bed polymerization reactor of claim 17, wherein the ratio of the volume of the mixing chamber in $cm^3$ to the volume of condensed liquid in $cm^3$/sec passing through the chamber is in the range of from $5 \times 10^{-3}$ to $5 \times 10^{-1}$ seconds.

21. The fluidized bed polymerization reactor of claim 1, including a compressor to compress the separated cooled gaseous stream recycled to the inlet means.

22. The fluidized bed polymerization reactor of claim 21, wherein the compressor is located between the cooling means and the separating means and additional cooling means is located between the compressor and the separating means to remove heat of compression from the gaseous stream.

23. The fluidized bed polymerization reactor of claim 21, wherein the compressor is located between the separating means and the inlet means.

24. The fluidized bed polymerization reactor of claim 23, including additional cooling means between the compressor and the inlet means to remove heat of compression from the recycled gaseous stream.

25. The fluidized bed polymerization reactor of claim 1, wherein the gas induced atomizing nozzle injects the atomized stream of the condensed liquid at a horizontal momentum flux of at least $200 \times 10^3$ Kg $s^{-1}m^{-2} \times ms^{-1}$.

26. The fluidized bed polymerization reactor of claim 25, wherein the flux is in the range of from $300 \times 10^3$ to $500 \times 10^3$ Kg $s^{-1}m^{-2} \times ms^{-1}$.

* * * * *